United States Patent
Matlin et al.

(10) Patent No.: US 7,398,814 B2
(45) Date of Patent: Jul. 15, 2008

(54) PORTABLE LAMINATOR

(75) Inventors: Tai Hoon Kim Matlin, Round Lake Beach, IL (US); Jean Ellen Kiple, Lake Villa, IL (US); David John McCutcheon, Evanston, IL (US); Jimmy-Quang Viet Doan, Chicago, IL (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 11/275,439

(22) Filed: Jan. 3, 2006

(65) Prior Publication Data

US 2006/0151120 A1  Jul. 13, 2006

Related U.S. Application Data

(60) Provisional application No. 60/641,232, filed on Jan. 3, 2005.

(51) Int. Cl.
*B32B 37/00* (2006.01)
(52) U.S. Cl. ............... 156/555; 156/579; 156/582; 156/583.1
(58) Field of Classification Search ............ 156/358, 156/359, 555, 579, 580, 582, 583.1
See application file for complete search history.

(56) References Cited

U.S. PATENT DOCUMENTS

| 5,232,538 | A  |    | 8/1993  | Liu |
|-----------|----|----|---------|-----|
| 5,445,700 | A  |    | 8/1995  | Uang |
| 5,476,568 | A  | *  | 12/1995 | Marion et al. ............... 156/359 |
| 6,418,996 | B1 |    | 7/2002  | Hsiano |
| 6,779,578 | B2 |    | 8/2004  | Casaldi |
| 6,805,179 | B2 |    | 10/2004 | Velasquez |
| 7,022,203 | B2 | *  | 4/2006  | Messina et al. ............. 156/238 |

OTHER PUBLICATIONS

International Search Report for Application PCT/US06/00395.

\* cited by examiner

*Primary Examiner*—James Sells
(74) *Attorney, Agent, or Firm*—Wood, Phillips, Katz, Clark & Mortimer

(57) ABSTRACT

A portable laminator designed primarily for home use where the laminator includes a handle for carrying which may also act as a guide for articles being fed into the laminator. In alternate embodiments, the laminator includes a cover which may first position acts as a guide for material being fed into the laminator and in a second position acts as a cover for the laminators feed slot. In additional embodiments, the laminator includes a double walled housing to provide insulation from the heating elements.

8 Claims, 7 Drawing Sheets

PORTABLE LAMINATOR

RELATED APPLICATION

This application claims priority to U.S. Provisional Application No. 60/641,232, filed on Jan. 3, 2005.

FIELD OF THE INVENTION

This invention relates to office laminating machines or laminators. More specifically, this application relates to portable laminators designed for home use.

BACKGROUND OF THE INVENTION

Small laminators for office use are well known in the Office Equipment Industry. Generally, the units are approximately the size of a typewriter, and include a housing design to sit on a countertop, desktop, or other horizontal surface. The laminators of the prior art are intended to remain in one place once installed, and are not designed for portability or storage if used infrequently.

The laminators are generally positioned horizontally, and include a faceplate which faces the user when the laminator is positioned for use. The faceplate includes a horizontal feed slot, where a user inserts the article to be laminated. Prior to insertion, the user places the article between two plastic films. Inside the feed slot is a conveying mechanism, usually a pair of rollers, which grab the article and convey the article into the heater. There, the heater subjects the films to heat from a heating plate or other heating element, thereby fusing the plastic films to one another about the perimeter of the article as the article passes by, resulting in a laminated article. The laminated article is then conveyed out the feed slot where it is retrieved by the user. In some embodiments in the prior art, the laminated article is conveyed through a separate output slot instead of going back through the feed slot. In other embodiments, well known in the prior art, the user need not place the article between the films, as the laminator includes mechanisms to place the article between two films.

Because the heating elements generate high temperatures to fuse the plastic films, the outside of the laminator housing, particularly the area in closest proximity to the heating elements can become hot to the touch. To limit the heating of the housing exposed to the user, the housing of the present invention includes an air gap or channel, to limit the conduction of heat from the heating elements to the outer housing of the laminator. The air gap is created by using two housings isolate the heating elements from the user.

Additionally, the laminators of the prior art are not designed for portability or ease of storage. The feed slots do not include a cover or other structure as part of the housing, thereby leaving the feed slot open to the environment when the laminator is not in use. This exposure allows dust and other debris to enter the feed slot, contaminating the films and mechanisms within the housing. Since the laminators of the prior art are not designed to be moved from place to place, they do not include a carrying handle or structure to store the power cord.

SUMMARY OF THE INVENTION

The laminator described herein includes features to provide ease of portability and storage as well as advantages when the laminator is in use, such as a deployable feed tray and a cool to the touch housing. Such advantages are not only beneficial for a home user, but are also advantageous for office situations where the laminator is infrequently used. Additionally, the features are applicable to other portable devices which include a feed slot, such as printers and shredders. Additionally, the double walled housing or air gap can be applicable to non-portable, heat generating office equipment.

The housing includes a handle positioned below the feed slot. A dust cover is hingedly attached to the housing between the handle and the feed slot. This positioning allows the handle to support the dust cover when the dust cover is in the down position exposing the feed slot. In the down position, the dust cover forms a feed tray to help guide the article to be laminated into and out of the feed slot. In the closed position, the dust cover is positioned up against the housing so as to cover the feed slot and prevent dust and other debris from entering the feed slot, particularly when the laminator is stored in an upright or vertical position.

To aid in storing the laminator, the housing includes protrusions on the back plate on which to wrap the power cord when not in use. The protrusions are positioned on the back plate in an arrangement to form legs to allow the laminator to be stored in an upright position.

To produce a cool to the touch outer cover, the outer cover of the laminator is separated from an inner housing by an air gap. The use of a double housing to separate the heating elements from the user creates an outer housing that is cooler than a single walled model. In some embodiments, the outer cover may include posts or ribs to contact the inner housing in select places. The post or ribs maintain the space between the cover and inner housing, and may additionally provide strength to the outer or inner cover. The ribs can be arranged to provide air channels or compartmentalize the air gap, and provide specific pathways for air to flow between the cover and inner housing. To improve air flow, a fan may be positioned to force air to move through the air gap. In other embodiments, the space between the cover and inner housing can include insulation or other material to limit the conduction of heat to the outer cover.

DETAILED DESCRIPTION OF THE PREFERRED EMBODIMENT

Figure 1:
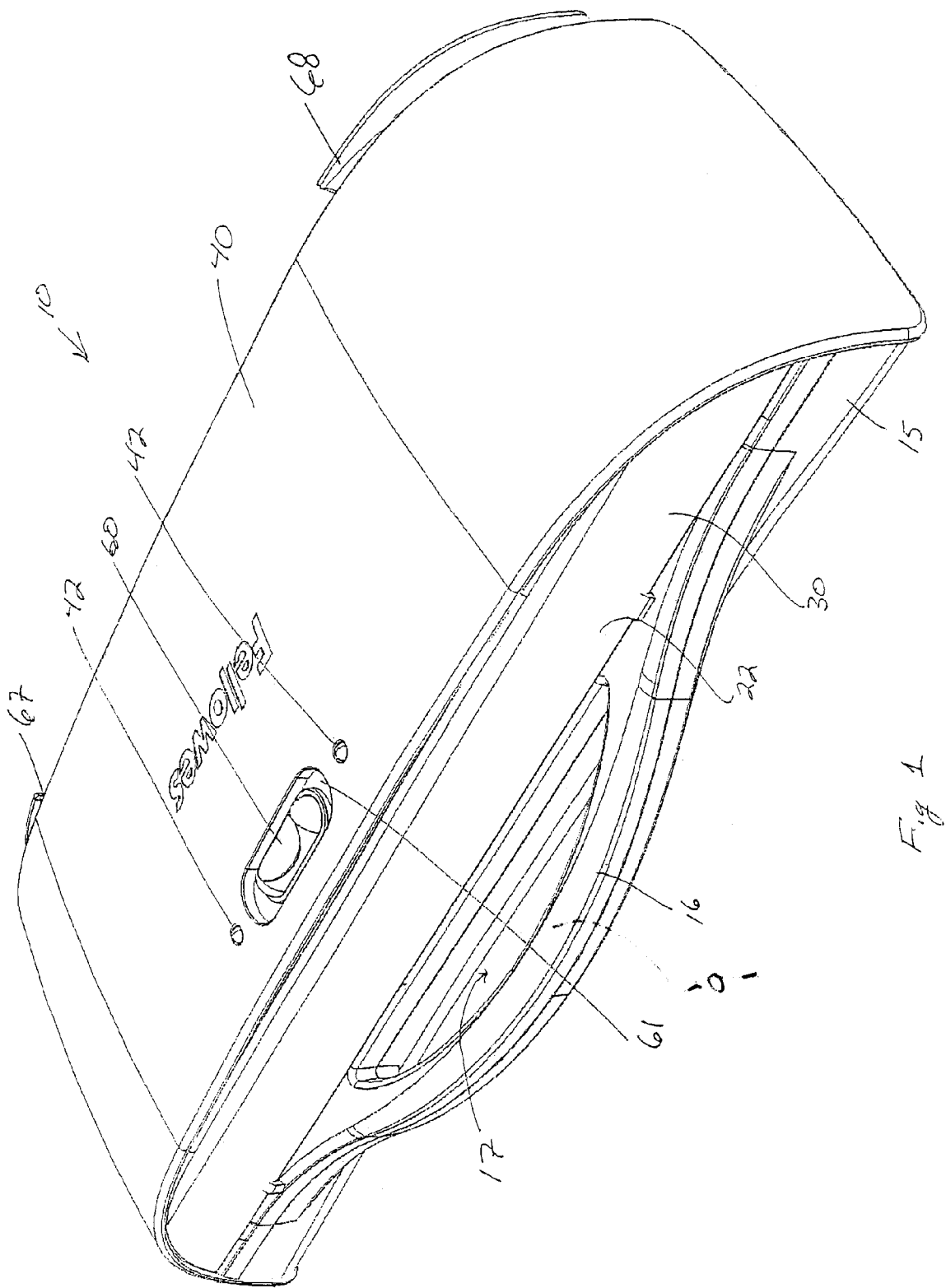
FIG. 1 is a top perspective view of the laminator showing the cover in a closed position.
Figure 2:
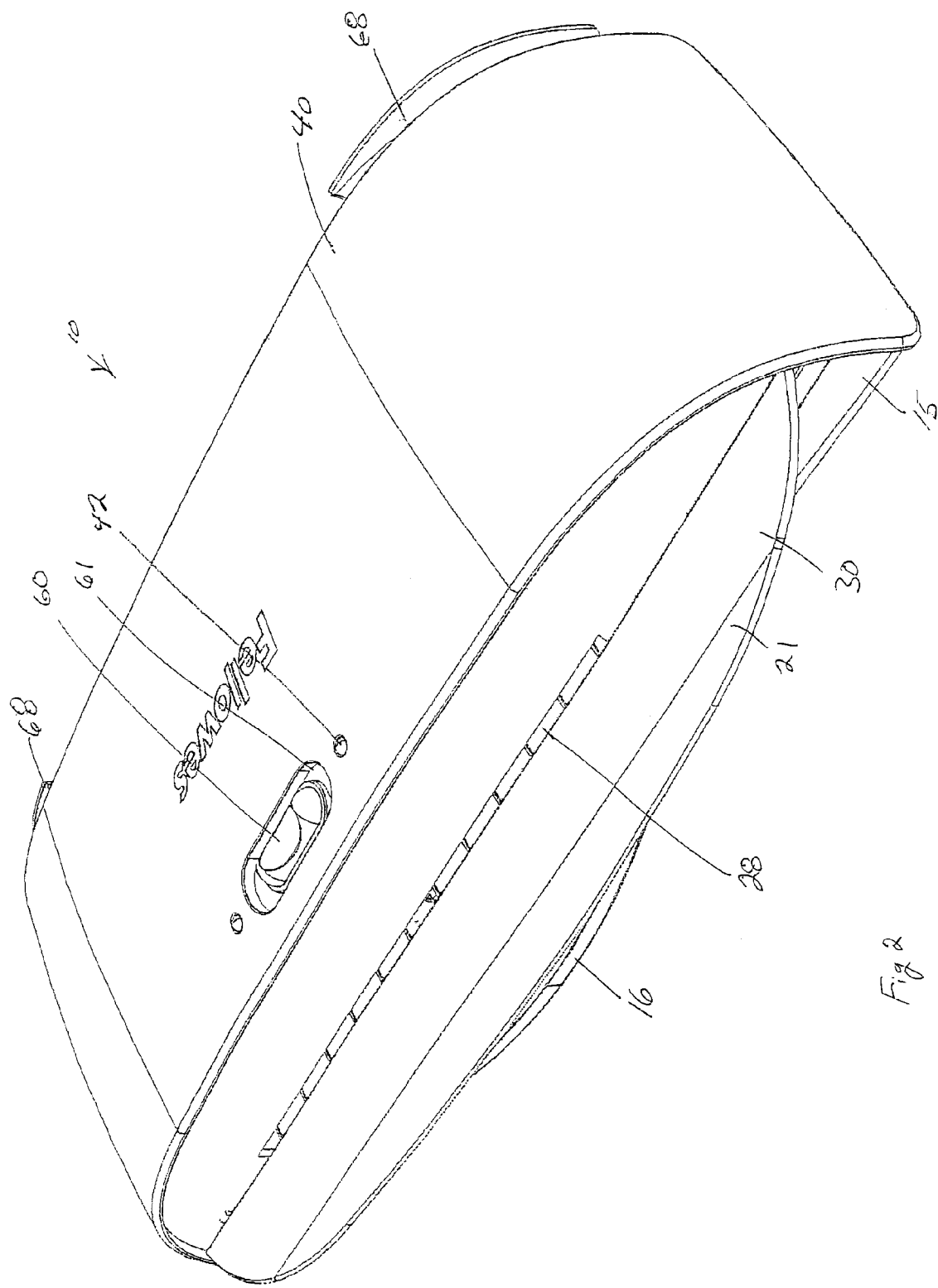
FIG. 2 is a top perspective view of the laminator showing the cover in an open position.
Figure 3:
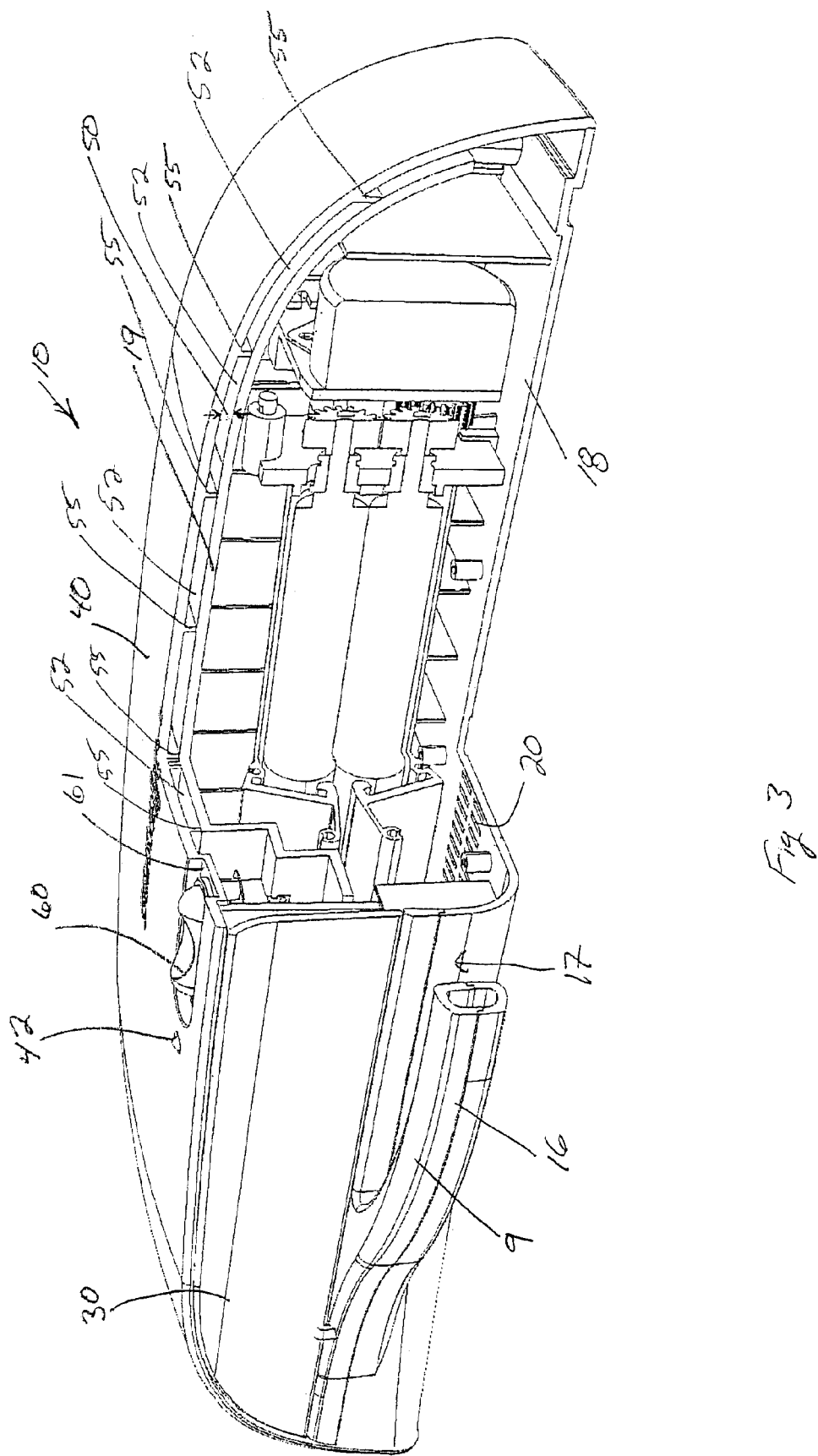
FIG. 3 is a partial cut away view of the laminator.
Figure 4:
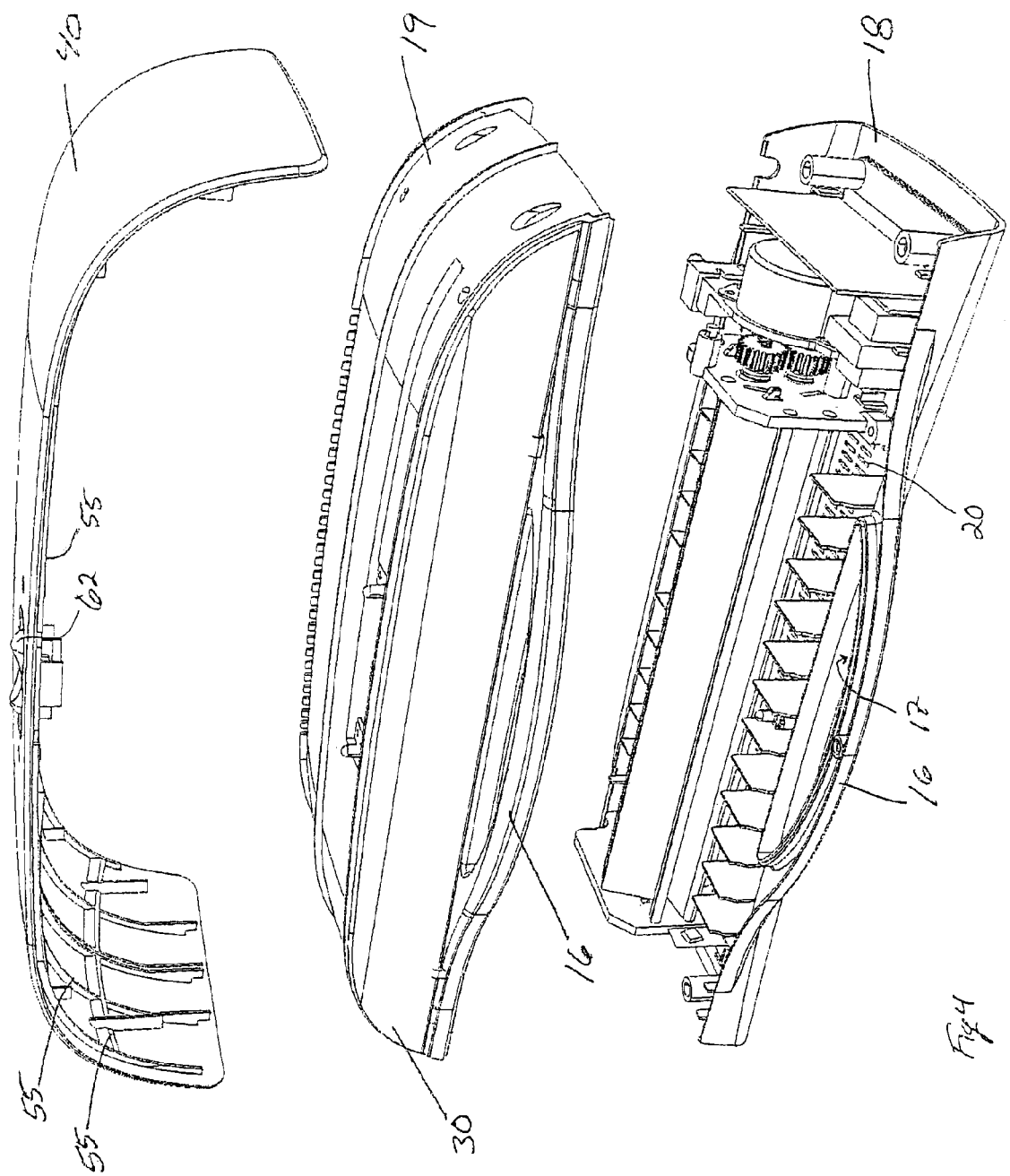
FIG. 4 is an exploded view of the housing.
Figure 5:
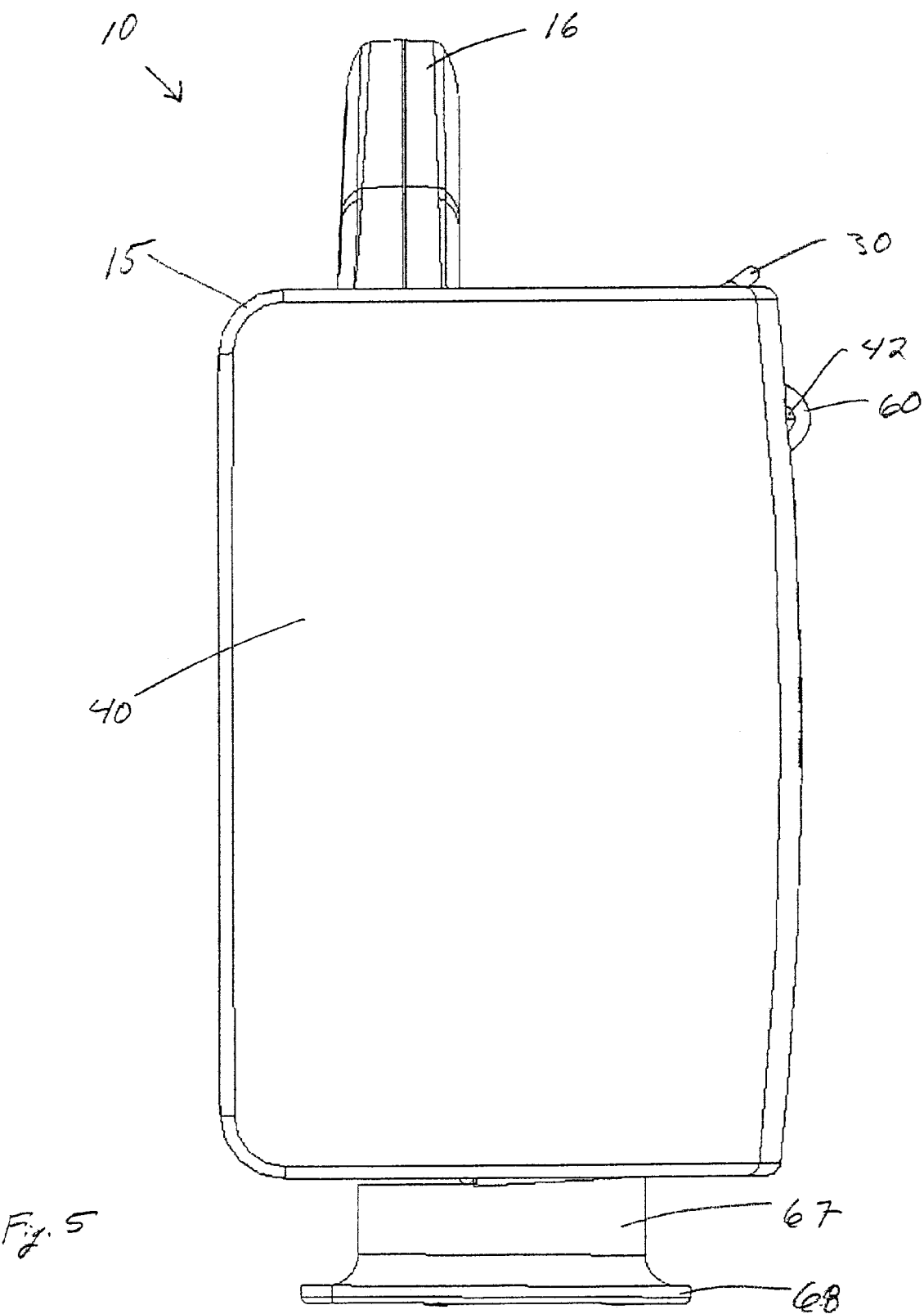
FIG. 5 is a side view of the laminator.
Figure 6:
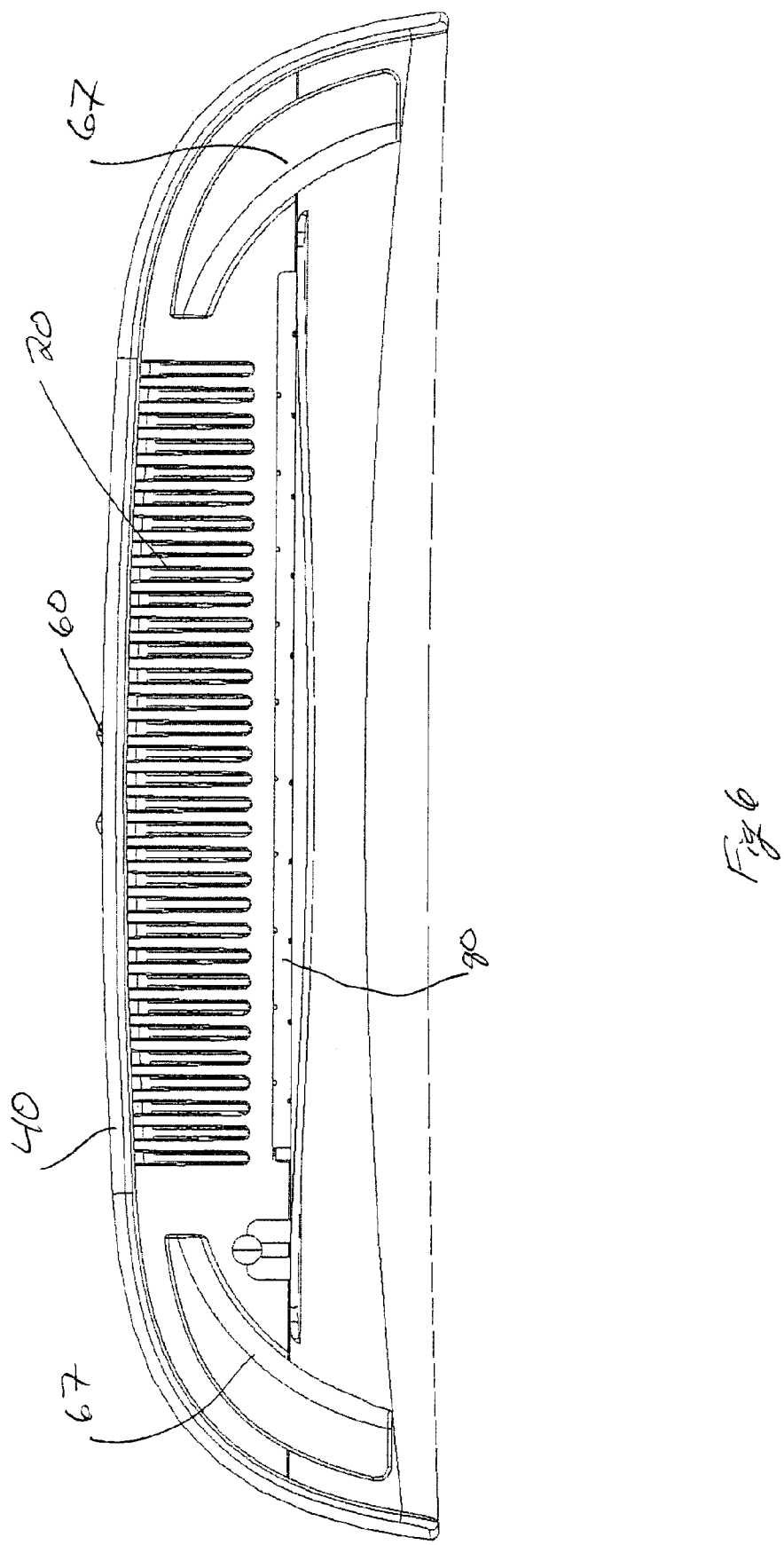
FIG. 6 is a back view of the laminator.
Figure 7:
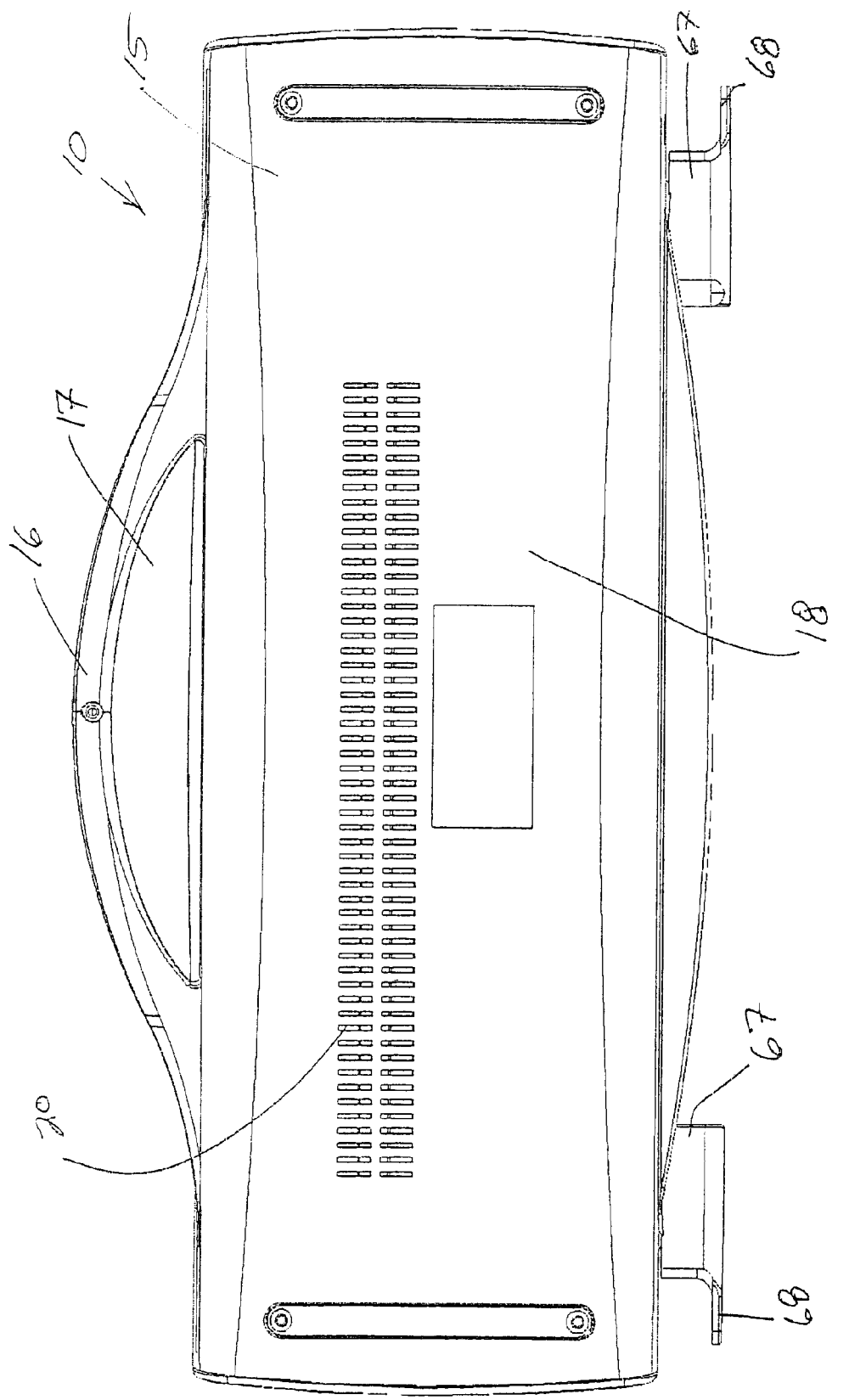
FIG. 7 is a bottom view of the laminator.

The laminator 10 includes a case 15 including a handle 16. The case 15 includes a base 18 and a top 19. Both the base 18 and the top 19 include vents 20 to allow the circulation of the air into the case 10, to cool the mechanical and electrical components of the laminator 10. When in use, the base 18 rests on a counter or other horizontal surface.

The case 15 is shaped to include a generally flat bottom portion for resting upon a counter, a generally flat back portion, which include protrusions to act as feet and to wrap the power cord around, and a generally flat front portion which includes a handle. The top side of the case includes two arcuate end portions linked by a generally straight and planar middle portion.

The base 18 and top 19 are fastened together with screws or other fasteners to form a housing 25 having a chamber for securing and containing the operating mechanisms of the laminator 10. The housing 25 includes the handle 16, preferably formed as an integral part thereof. The handle 16 can assume many orientations, but it is preferably parallel to the feed slot 28. In the preferred embodiment the handle is fixed in orientation and includes an aperture 17 for the user to grip when carrying.

The handle 16 is located below the feed slot 28 when the laminator is resting upon the base member 18, as positioned when in use. A handle 16 can act as a guide or support for material entering the feed slot, if the top surface 9, of the handle 16 is approximately even or slightly higher than the feed slot 28. Optionally, a cover 30 is hingedly attached to the housing 25 between the feed slot 28 and the handle 16. The cover 30 is adapted to maintain a first position 21 to form a guide for material being fed into the laminator 10 for lamination. In the first position 21, the cover 30 rests upon the handle 16. In a second position 22, the cover 30 rests upon the housing 25 so as to cover the feed slot 28. The second position 22 is of benefit when the laminator 10 is stored in an upright position with the feed slot 28 perpendicular to the ground, the cover then covering the feed slot 28 to prevent debris and other items from falling and entering the laminator 10 through the feed slot 28.

The case 15 further includes an outer housing 40 placed over the top 19 and secured with fasteners 42. The outer housing 40 is positioned so as to maintain an air gap 50 between substantial portions of the outer housing 40 and top 19. To aid in maintaining the gap, ribs 55 are present on the underside of the outer housing 40. The ribs 55 also lend support in maintaining the shape of the outer housing 40. The ribs 55 can be judiciously arranged to form air channels 52 to direct the air through the air gap 50. A fan (not shown) may be placed in communications with the air channels 52 to improve the flow of air through the air gap 50. A power switch 60 is located in a recess 61 on the outer housing 40.

The back plate 65 includes an exit slot 80 where the laminated article exits the laminator when the laminator 10 is stored in an upright position, the exit slot 80 faces the ground, and does not fully benefit from a cover, as debris generally does not flow upwards. However, one skilled in the art will recognize that a cover, similar to the hinged cover described above could be applied to the exit slot 80. In such an arrangement, the protrusions 67 would include stops to hold the cover in a position to guide the laminated article as it exits the exit slot 80.

The case 15 includes protrusions on the back plate 65 of the housing 25. The back plate 65 is opposite the feed slot 28. The protrusions 67 are positioned to act as feet and support the case 15 in an upright position when the laminator 10 is stored. In the most preferred embodiment, the protrusions 67 extend away from the back plate 65 at least ½ inch. The protrusions further include tabs 68 extending away from the protrusions 67, but not so far to exceed the extended perimeter of the case 15. The tabs 68 act as a base to support the case 15 in an upright position, and serve to retain the power cord when the power cord is wrapped around the protrusions for storage. One skilled in the art will recognize the protrusions 67 can take on many configurations and number, so long as they permit the case 15 to stand upright, that is with the back plate 65 parallel to the supporting surface.

In the most preferred embodiment, the protrusions are at least two in number and include a base portion generally parallel to the back plate 65, the base portion being attached to the back plate 65 by a support portion. The support portion may be a single tubular structure, or may be a plurality of posts or other members linking the base number to the back plate. The base member is shaped to include an arcuate portion generally striking an arc similar to the arcuate portion of the case. One skilled in the art will recognize the base portion need not assume this structure. The support portion is generally narrower than the base portion, to allow room for a power cord to be wrapped between and about the support portions of the protrusions. In such a way, the laminator may be stored upright on the base portions while the power cord is wrapped about the protrusions and not interfering with the storage. In the preferred embodiment, the base portion includes a first straight portion generally perpendicular to the ground and a second straight portion parallel to the ground and two portions joined at a vertex. Opposite the vertex, is an arced portion generally maintaining an arc similar to the arc of the housing.

The embodiments described herein are merely illustrative, and are not meant to limit the scope of the invention.

What is claimed:

1. A laminator including:
   a housing containing heating elements;
   a feed slot for feeding material in the heating elements;
   a cover hinged to the housing, the cover having a first position to form a guide for the material being fed into the feed slot and a second position to cover the feed slot; and further including a handle located adjacent the feed slot, the handle supporting the cover when the cover is in the first position.

2. The laminator of claim 1,
   further including an outer housing,
   the outer housing separated from the housing by an air gap.

3. The laminator of claim 2, further including ribs between the housing and the outer housing, the ribs maintaining the air gap between the housings.

4. The laminator of claim 1, wherein the laminator includes:
   an exit slot, and a second cover hinged to the housing, the second cover having a first position to cover the exit slot, and a second position to guide material exiting the exit slot; a handle adjacent to the feed slot, the handle supporting the cover wherein the cover is in the first position; and an outer housing, the outer housing separated from the housing by an air gap.

5. The laminator of claim 4, the laminator having a back plate opposite the feed slot, the back plate including feet to support the laminator when the laminator is placed upright.

6. The laminator of claim 5, the feet including a base portion attached to the back plate by a support portion, the support portion being narrower than the base portion, the base portion extending away from the support portion.

7. A laminator including:
   a housing containing heating elements;
   a feed slot in the housing for feeding material into the laminator;
   a handle fixed in position adjacent the feed slot;
   a second housing, the second housing separated from the housing to create an air gap; and
   a cover attached to the housing wherein the cover has a first position to guide material into the feed slot and a second position to cover the feed slot, the cover resting upon the handle when in the first position.

8. The laminator of claim 7, wherein an outer housing is positioned over a portion of the first housing, an air gap being present between the two housings.

* * * * *